United States Patent
Sausen et al.

(10) Patent No.: US 12,385,585 B2
(45) Date of Patent: Aug. 12, 2025

(54) FLUID CONNECTOR INCLUDING A RETAINING CLIP CARTRIDGE

(71) Applicant: Oetiker NY, Inc., Lancaster, NY (US)

(72) Inventors: Kari Ann Sausen, Clarence, NY (US); Kristian James Hagen, Gasport, NY (US)

(73) Assignee: Oetiker NY, Inc., Lancaster, NY (US)

(*) Notice: Subject to any disclaimer, the term of this patent is extended or adjusted under 35 U.S.C. 154(b) by 454 days.

(21) Appl. No.: 17/757,662

(22) PCT Filed: Dec. 19, 2019

(86) PCT No.: PCT/US2019/067391
§ 371 (c)(1),
(2) Date: Jun. 17, 2022

(87) PCT Pub. No.: WO2021/126204
PCT Pub. Date: Jun. 24, 2021

(65) Prior Publication Data
US 2023/0020784 A1    Jan. 19, 2023

(51) Int. Cl.
*F16L 37/088* (2006.01)
*F16L 13/16* (2006.01)

(52) U.S. Cl.
CPC ......... *F16L 37/0885* (2019.08); *F16L 13/163* (2013.01)

(58) Field of Classification Search
CPC .... F16L 37/0885; F16L 13/163; F16L 37/088
See application file for complete search history.

(56) References Cited

U.S. PATENT DOCUMENTS

| | | | |
|---|---|---|---|
| 3,922,011 A * | 11/1975 | Walters | F16L 37/088 285/902 |
| 4,538,679 A | 9/1985 | Hoskins et al. | |
| 4,733,890 A | 3/1988 | Vyse | |
| 4,867,484 A | 9/1989 | Guest | |
| 5,161,834 A | 11/1992 | Norkey | |
| 5,749,606 A * | 5/1998 | Lu | F16L 37/1225 285/305 |
| 6,543,814 B2 | 4/2003 | Bartholomew | |
| 7,621,569 B2 | 11/2009 | Anthoine | |
| 9,447,906 B2 | 9/2016 | Bobo et al. | |
| 9,541,228 B2 | 1/2017 | Bobo et al. | |
| 9,777,875 B2 | 10/2017 | Bobo et al. | |
| 10,006,575 B2 | 6/2018 | Bobo et al. | |
| 10,221,976 B2 * | 3/2019 | Kujawski | F16L 41/03 |

(Continued)

FOREIGN PATENT DOCUMENTS

| CN | 107667021 | 2/2018 |
|---|---|---|
| CN | 108139005 A | 6/2018 |

(Continued)

*Primary Examiner* — James M Hewitt, II
(74) *Attorney, Agent, or Firm* — Harter Secrest & Emery LLP; Michael Nicholas Vranjes

(57) ABSTRACT

A cartridge for a fluid connector including a connector body having a bore and a flange, and a tube end form, the cartridge including a first end, a second end, a through-bore, a first radially outward facing surface including at least one aperture extending radially inward to the through-bore, and a retaining clip including at least one protrusion operatively arranged to extend into the through-bore.

18 Claims, 8 Drawing Sheets

(56) References Cited

U.S. PATENT DOCUMENTS

| | | |
|---|---|---|
| 10,823,323 B2 * | 11/2020 | Fremont ............... F16L 55/11 |
| 2007/0046026 A1 | 3/2007 | Wells et al. |
| 2007/0052237 A1 | 3/2007 | Udhofer et al. |
| 2015/0145240 A1 | 5/2015 | Kujawski et al. |
| 2015/0204621 A1 | 7/2015 | Wolf |
| 2017/0114935 A1 * | 4/2017 | Kujawski, Jr. ...... F16L 37/0885 |
| 2017/0254453 A1 | 9/2017 | Fremont et al. |
| 2018/0299051 A1 | 10/2018 | Baldreich et al. |
| 2020/0166167 A1 | 5/2020 | Hagen et al. |

FOREIGN PATENT DOCUMENTS

| | | |
|---|---|---|
| DE | 20316743 U1 | 1/2004 |
| DE | 102004031247 A1 | 4/2005 |
| DE | 202010002385 U1 | 6/2011 |
| DE | 102015103228 A1 | 9/2016 |
| EP | 1865245 A1 | 12/2007 |
| JP | 2006189156 A | 7/2006 |

* cited by examiner

FLUID CONNECTOR INCLUDING A RETAINING CLIP CARTRIDGE

FIELD

The present disclosure relates to fluid connectors, and, more particularly, to a fluid connector including a cartridge for a retaining clip that eliminates the need for post-process machining of a connector body and ensures that the retaining clip is always contained.

BACKGROUND

Fluid connectors are integral components for many applications, and especially for automotive applications. Since an automotive system is made up of various components such as a radiator, transmission, and engine, fluid must be able to travel not only within each component but also between components. An example of fluid traveling between components is the transmission fluid traveling from the transmission to the transmission oil cooler in order to lower the temperature of the transmission fluid. Fluid predominantly moves between components via flexible or rigid hoses which connect to each component by fluid connectors. Such fluid connectors typically include a retaining clip, retaining ring clip, or snap ring carried on the connector body which is adapted to snap behind a raised shoulder of a tube end form when the tube end form is fully inserted into the connector body. However, in order for the fluid connector to properly function, slots or apertures must be machined in the connector body such that the retaining clip can protrude therethough and engage the tube end form, which requires extra post-process manufacturing. Additionally, during the assembly process, installation of the retaining clip onto the connector body is difficult and failure to install the retaining clip properly can jeopardize the structural integrity of the retaining clip. Furthermore, since the retaining clips are very thin and small, it is easy to lose them if dropped or misplaced.

Thus, there has been a long-felt need for a fluid connector including a retaining clip cartridge that eliminates the need for post-process machining, contains the retaining clip, and reduces the insertion force required to assemble the fluid connector.

SUMMARY

According to aspects illustrated herein, there is provided a cartridge for a fluid connector including a connector body having a bore and a flange, and a tube end form, the cartridge comprising a first end, a second end, a through-bore, a first radially outward facing surface including at least one aperture extending radially inward to the through-bore, and a retaining clip including at least one protrusion operatively arranged to extend into the through-bore.

According to aspects illustrated herein, there is provided a fluid connector, comprising a connector body, including a first through-bore, a first groove arranged circumferentially within the first through-bore, a seal arranged within the first groove, and a flange, and a cartridge operatively arranged to be inserted into the first through-bore, including a first end, a second end, a second through-bore, a first radially outward facing surface including at least one aperture extending radially inward to the second through-bore, and a retaining clip operatively arranged on the radially outward facing surface, the retaining clip including at least one protrusion extending through the at least one aperture and into the second through-bore.

According to aspects illustrated herein, there is provided a fluid connector, comprising a connector body, including a first through-bore, a first groove arranged circumferentially within the first through-bore, a seal arranged within the first groove, and a malleable flange, a cartridge operatively arranged to be secured in the first through-bore, including a first end, a second end, a second through-bore, a first radially outward facing surface including at least one aperture extending radially inward to the second through-bore, and a retaining clip operatively arranged to extend through the at least one aperture and into the second through-bore, and a tube end form operatively arranged to be secured in the connector body via the cartridge.

According to aspects illustrated herein, there is provided a fluid connector having a connector body, a cartridge including a retaining clip, and a tube end form. The use of a retaining clip cartridge addresses space efficiency requirements and ergonomic concerns at assembly plants. In addition, it improves component assembly and manufacturability through process improvements along with reducing debris for improved cleanliness. Manufacturer and assembler cleanliness requirements are becoming more stringent and the tube to connector body insertion force requirements are decreasing to allow for ease of assembly from all assembly positions.

The clip cartridge includes molded retainer clip slots into an injection molded (e.g., powder injection molding (PIM) or metal injection molding (MIM)) cartridge, which eliminates the need for post process techniques that is typically required to make the slots during a machining process. The post-process machining leads to debris (i.e., shavings). The cartridge includes indexing slots molded therein that serve as an alignment feature for the assembly of the clip. The cartridge may comprise, for example, a polymer. The interaction of the clip and the cartridge (e.g., polymer) reduces tube insertion forces. The present disclosure ensures that the retaining clip is always contained, which addresses a quality issue that an end user may receive a fluid connector without retaining clips.

The clip cartridge, when inserted and secured in the connection body, may create the second half of the seal or O-ring gland. This eliminates the need to produce an interior groove that contains the seal within the connector body and thus simplifies the manufacturing process of the connector body. Once the cartridge is inserted into the connector body, a flange of the connector body that overhangs the cartridge is crimped, swaged, folded over the proximal end of the cartridge securing it within the connector body.

In some embodiments, the cartridge fully encloses the retaining clip. The retaining clip is assembled into the cartridge. A seal or an O-ring is inserted into the connector body. The cartridge and retaining clip assembly is inserted into the connector body. At the proximal end of the connector body there is an outer diameter material, flange, or returns that is crimped, swaged, folded over, etc. to secure the cartridge and retaining clip assembly therein.

In some embodiments, the cartridge does not fully enclose the retaining clip and allows for a top down assembly, which reduces or eliminates the chance of radial expansion of the retaining clip during installation. A seal or O-ring is inserted into the connector body. The cartridge is inserted into the fitting. The retainer clip is placed onto the proximal end of the cartridge. At the proximal end of the connector body there is an outer diameter material, flange, or returns that is crimped, swaged, folded over, etc. to secure the cartridge and retaining clip therein. The folded material retains the clip.

In some embodiments, any style retainer clip suitable for securing the tube end form in the connector body may be used. When the flange is crimped over the cartridge a retaining clip groove is formed and the cartridge and the retaining clip are secured within the connector body.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

Figure 1:
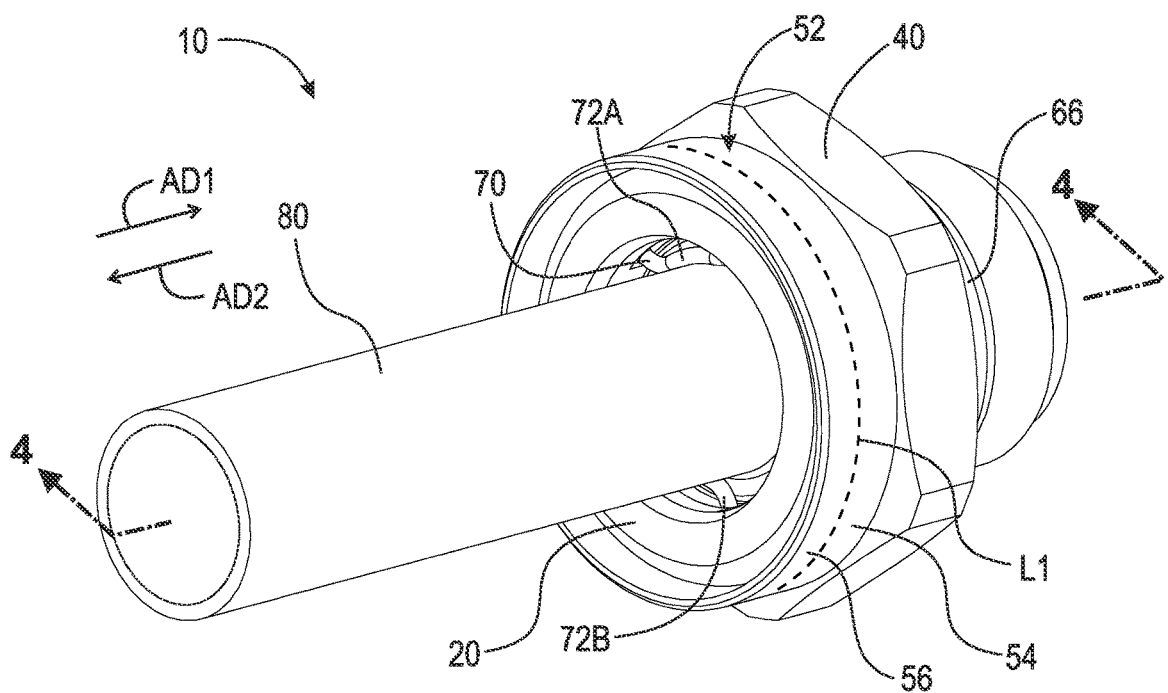
FIG. 1 is a perspective view of a fluid connector, in an unsecured state.

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

It should be understood that use of "or" in the present application is with respect to a "non-exclusive" arrangement, unless stated otherwise. For example, when saying that "item x is A or B," it is understood that this can mean one of the following: (1) item x is only one or the other of A and B; (2) item x is both A and B. Alternately stated, the word "or" is not used to define an "exclusive or" arrangement. For example, an "exclusive or" arrangement for the statement "item x is A or B" would require that x can be only one of A and B. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and, a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element. A similar interpretation is intended when the phrase "used in at least one of:" is used herein. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Figure 2:
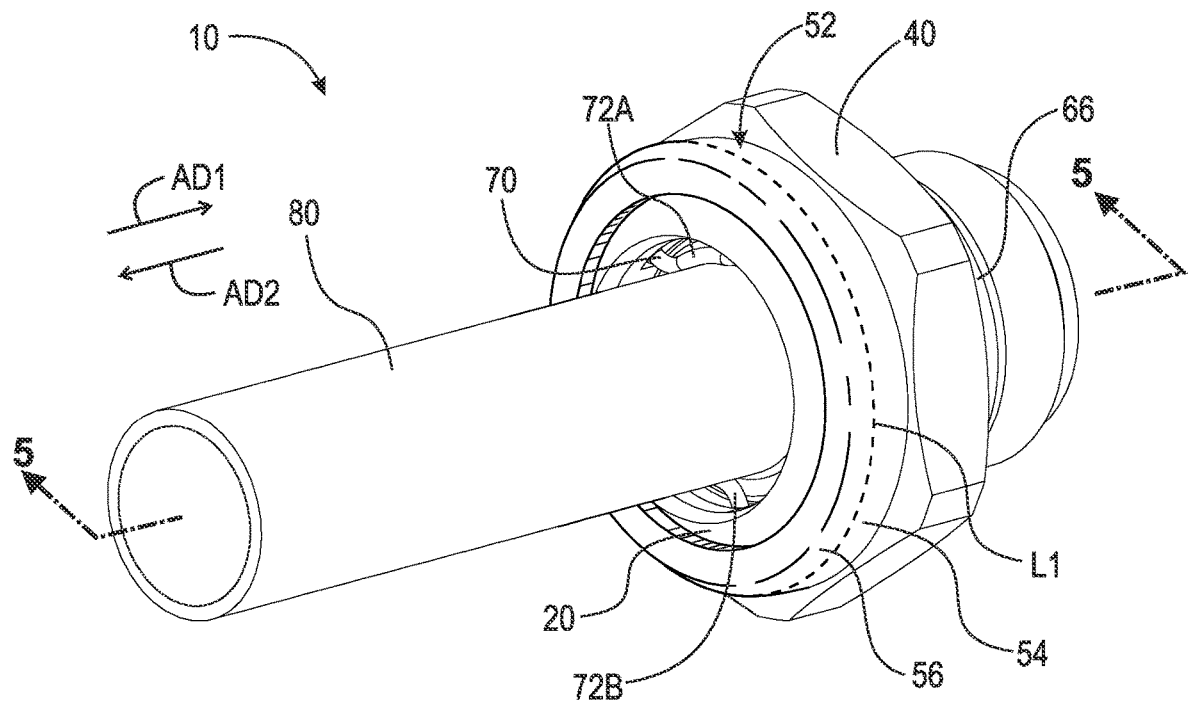
FIG. 2 is a perspective view of the fluid connector shown in FIG. 1, in a secured state.
Figure 3:
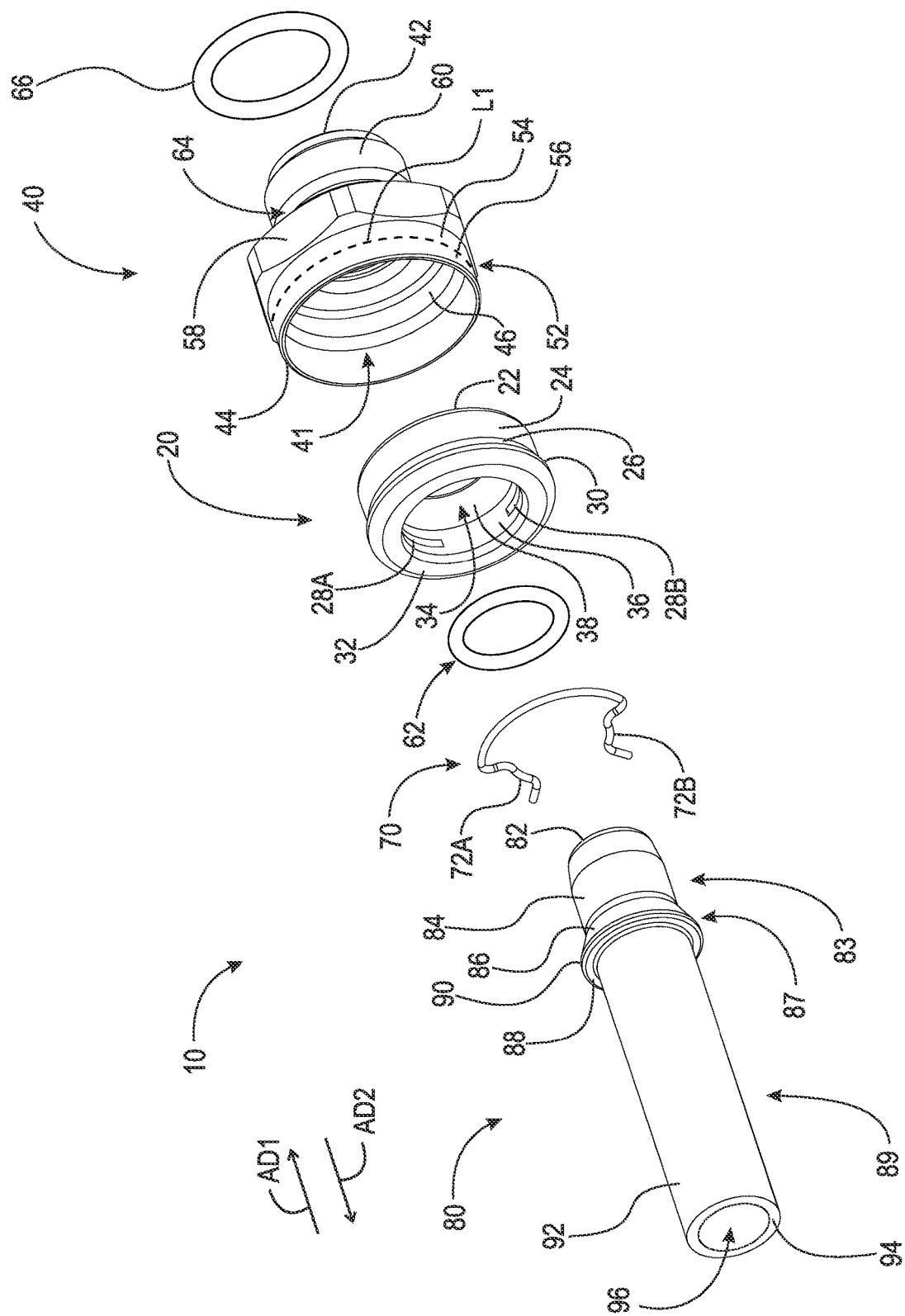
FIG. 3 is an exploded view of the fluid connector shown in FIG. 1.
Figure 4:
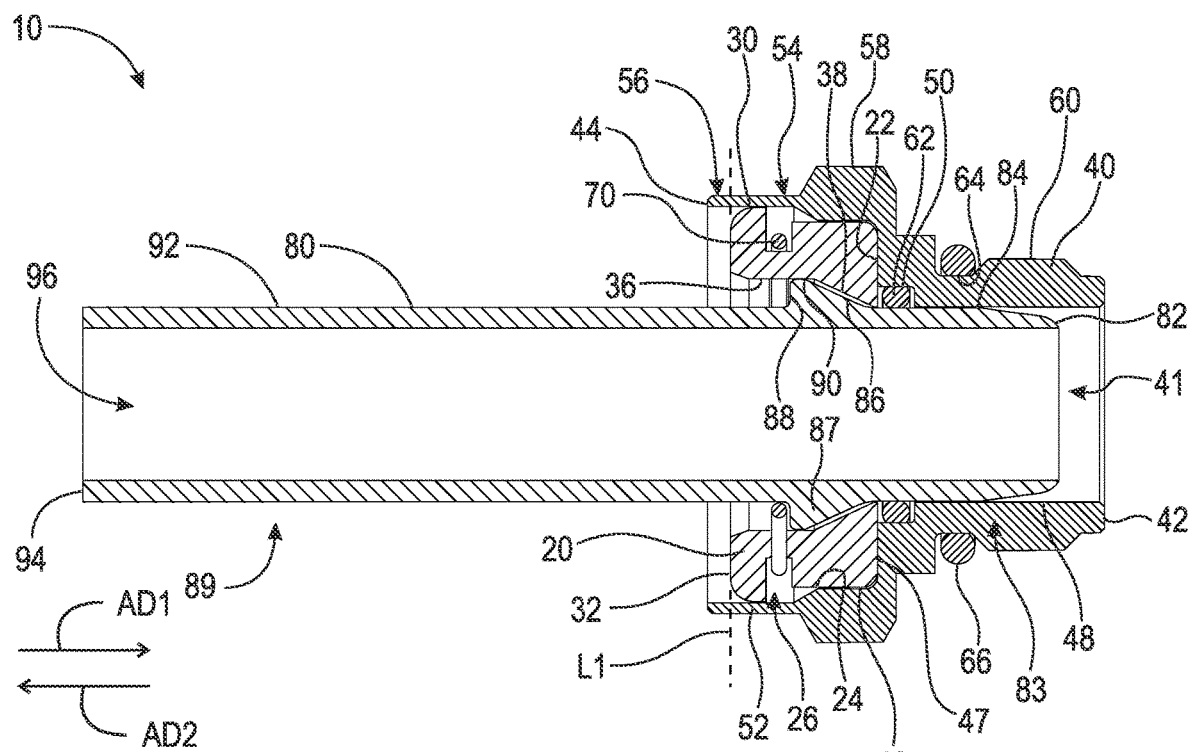
FIG. 4 is a cross-sectional view of the fluid connector taken generally along line 4-4 in FIG. 1.
Figure 5:
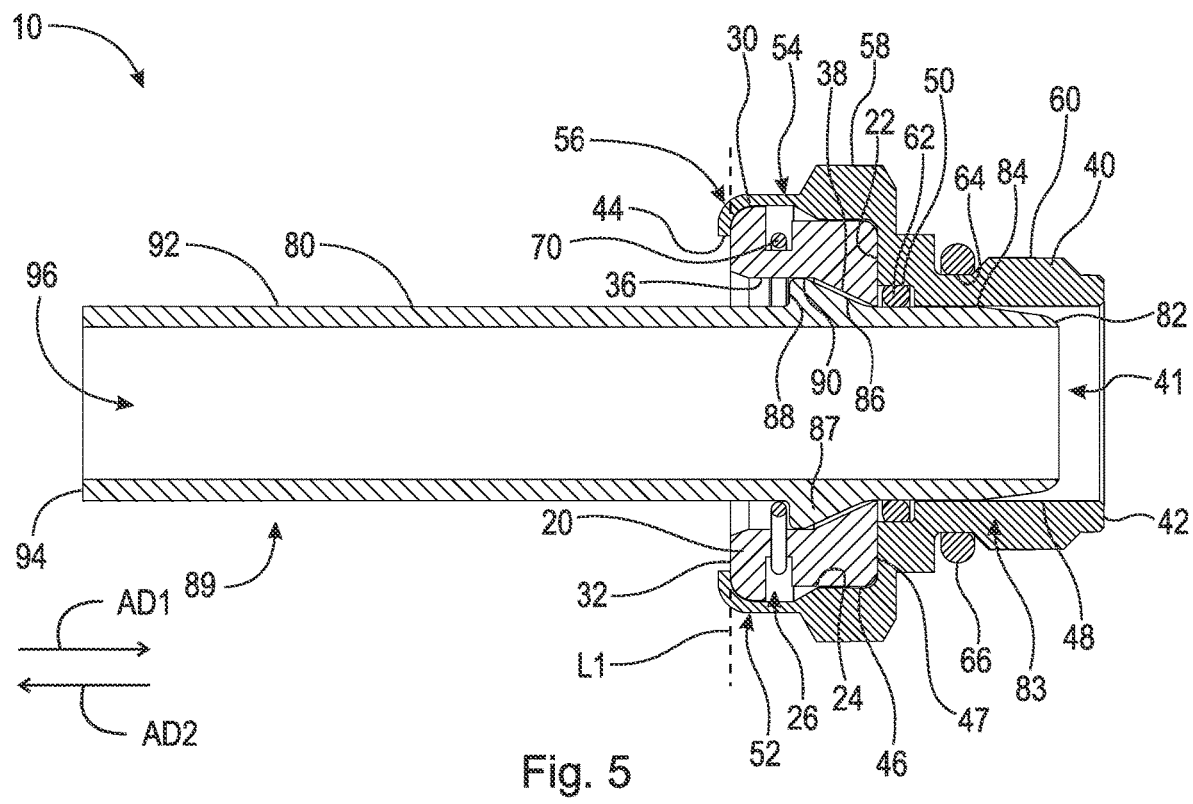
FIG. 5 is a cross-sectional view of the fluid connector taken generally along line 5-5 in FIG. 2.

Adverting now to the figures, FIG. 1 is a perspective view of fluid connector 10, in an unsecured state. FIG. 2 is a perspective view of fluid connector 10, in a secured state. FIG. 3 is an exploded view of fluid connector 10. FIG. 4 is a cross-sectional view of fluid connector 10 taken generally along line 4-4 in FIG. 1. FIG. 5 is a cross-sectional view of fluid connector 10 taken generally along line 5-5 in FIG. 2. Fluid connector 10 generally comprises cartridge 20, connector body 40, and tube end form 80. For the purposes of the present disclosure, "unsecured state" is intended to mean that flange 52 of connector body 40 has not yet been crimped over cartridge 20. "Secured state" is intended to mean that section 56 of flange 52 has been crimped over cartridge 20 (or cartridge 30) thereby securing cartridge 20 and retaining clip 70 (or 170) within connector body 40. The following description should be read in view of FIGS. 1-5.

Connector body 40 comprises through-bore 41 extending from end 42 to end 44, radially inward facing surface 46, radially inward facing surface 48, groove 50, flange 52, head 58, and radially outward facing surface 60. Connector body 40 is arranged to be connected to a component that is filled with a fluid. For example, connector body 40 may be connected to a transmission via radially outward facing surface 60, which may comprise external threading. Connector body 40 may be screwed into a threaded hole in the transmission via head 58 (e.g., using a wrench), which is then filled with transmission fluid. In some embodiments, head 58 is hexagonal; however, it should be appreciated that head 58 may comprise any geometry suitable for applying torque to connector body 40. Another component in which fluid connector 10, specifically connector body 40, may be installed into is an engine block. It should be appreciated that fluid connector 10 may be used in various other components, assemblies, and subassemblies in which fluid connection is desired. Radially outward facing surface 60 may further comprise groove 64. Seal or O-ring 64 may be arranged in groove 64 to create a fluid tight seal between connector body 40 and the component it is connected to. Seal 62 is arranged in connector body 40. Specifically, seal 62 is arranged in groove 50. In some embodiments, seal 62 is an O-ring. Body 40 further comprises surface 47, which extends between and is connected to radially inward facing surface 46 and radially inward facing surface 48. Surface 47 is operatively arranged to engage cartridge 20, as will be described in greater detail below. Flange 52 extends from head 58 in axial direction AD2. Flange 52 comprises section 54 and section 56, which are shown in the figures as being separated by fold line L1. It should be appreciated that fold line L1 is an imaginary line used solely for the purposes of describing the folding action of flange 52 herein. In some embodiments, connector body 40 comprises a metal. In some embodiments, connector body 40 comprises a polymer with flange 52 comprising a suitable malleable material. In some embodiments, connector body 40 comprises a ceramic with flange 52 comprising a suitable malleable material.

Tube end form 80 comprises end 82, section 83, shoulder 87, section 89, end 94, and through-bore 96. Through-bore 96 extends through tube end form 80 from end 82 to end 94. Section 83 is arranged between end 82 and shoulder 87 and comprises radially outward facing surface 84. Radially outward facing surface 84 includes a substantially constant diameter. In some embodiments, radially outward facing surface 84 comprises a frusto-conical taper proximate end 82 (see FIGS. 4-5). Shoulder 87 is arranged between section 83 and section 89 and comprises radially outward facing surface 86, radially outward facing surface 90, and surface 88. As shown, radially outward facing surface 86 is a frusto-conical surface extending from radially outward surface 84 to radially outward facing surface 90. Radially outward facing surface 86 increases in diameter is axial direction AD2. In some embodiments, radially outward facing surface 86 is an axial surface facing at least partially in axial direction AD1. Radially outward facing surface 90 extends from radially outward facing surface 86 to shoulder surface 88. In some embodiments, radially outward facing surface 90 comprises a constant diameter. In some embodiments, radially outward facing surface 90 comprises a variable diameter. Shoulder surface 88 is an axial surface facing at least partially in axial direction AD2. Section 89 is arranged between shoulder 87 and end 94 and comprises radially outward facing surface 92. Radially outward facing surface 92 includes a substantially constant diameter. Tube end form 80 is arranged to be inserted, specifically with end 82 first, into connector body 40 and cartridge 20. Tube end form 80 is inserted into connector body 40 and cartridge 20 until retaining clip 70 snaps over shoulder 87. It is the engagement of protrusions 72A-B with shoulder surface 88 that secures tube end form 80 within connector body 40. It should be appreciated that tube end form 80 may be any traditional tube end form comprising a bead, radially outward extending protrusion or flange, or ramp profile, which extends radially outward and axially on the outer surface of the tube end form, to displace a retaining ring, snap ring, or wire clip within the connector body (and cartridge) to secure the tube end form within the connector body. In some embodiments, tube end form 80 comprises a metal. In some embodiments, tube end form 80 comprises a polymer. In some embodiments, tube end form 80 comprises a ceramic.

Cartridge 20 is operatively arranged to carry and enclose retaining clip 70. Cartridge 20 comprises end 22, radially outward facing surface 24, radially outward facing surface 30, end 32, and through-bore 34. Radially outward facing surface 24 comprises radially outward facing groove 26. Groove 26 further comprises one or more apertures (e.g., apertures 28A-B) which extend from groove 26 to through-bore 34. In some embodiments, the dimeter of radially outward facing surface 24 is less than the diameter of radially outward facing surface 30. In some embodiments, the dimeter of radially outward facing surface 24 is equal to the diameter of radially outward facing surface 30. In some embodiments, the dimeter of radially outward facing surface 24 is greater than the diameter of radially outward facing surface 30. Cartridge 20 further comprises radially inward facing surface 36 proximate end 32 and radially inward facing surface 38 proximal end 22. In some embodiments, radially inward facing surface 36 comprises a constant diameter. In some embodiments, radially inward facing surface 36 comprises a variable diameter. In some embodiments, radially inward facing surface 38 comprises a variable diameter (e.g., is frusto-conical). In some embodiments, radially inward facing surface 38 comprises a constant diameter with a flange arranged to engage shoulder 87. Cartridge 20 is operatively arranged to be inserted, with end 22 first, into through-bore 41 at end 44 of connector body 40 and secured therein. In some embodiments, cartridge 20 comprises a metal. In some embodiments, cartridge 20 comprises a polymer. In some embodiments, cartridge 20 comprises a ceramic.

Retaining clip (or retaining ring or snap clip/ring) 70 is arranged in groove 26 in cartridge 20. Retaining clip 70 is generally a retaining ring including one or more protrusions extending radially inward. In the embodiment shown, retaining clip 70 comprises protrusions 72A-B. Protrusions 72A-B extend radially inward through apertures 28A-B in groove 26. Protrusions 72A-B are arranged to engage shoulder 87, specifically, shoulder surface 88, to secure tube end form 80 within cartridge 20 and thus connector body 40. Retaining clip 70 may comprise any material that is capable of elastically deforming and returning to its original shape (e.g., metal, polymer, etc.).

To assembly fluid connector 10, cartridge 20 with retaining clip 70 is inserted into connector body 40. As shown in FIGS. 4-5, end 22 of cartridge 20 engages surface 47 of connector body 40. End 22 thereby forms the second half of the seal or O-ring gland by enclosing seal 62 within groove 50. Radially outward facing surface 24 is arranged proximate to or engages with radially inward facing surface 46. Radially outward facing surface 30 is arranged proximate to or engages with flange 52. Flange 52 is then crimped radially inward to secure cartridge 20 within connector body 40, as shown in FIG. 5. Specifically, section 56 is crimped or bent radially inward about bend line L1, until section 56 is arranged proximate to or abuts against end 32 of cartridge 20. In the secured state as shown in FIG. 5, cartridge 20 is prevented from displacement in axial direction AD1 by surface 47 and axial direction AD2 by crimped section 56. It should be appreciated that tube end form 80 is not inserted into cartridge 20 and connector body 40 until flange 52 has been crimped. FIG. 4 shows tube end form 80 inserted into cartridge 20 and connector body 40 in an unconnected state only to further illustrate the interaction and orientation of the components. However, tube end form 80 would not be present during the assembly of cartridge 20 and connector body 40.

Figure 6:
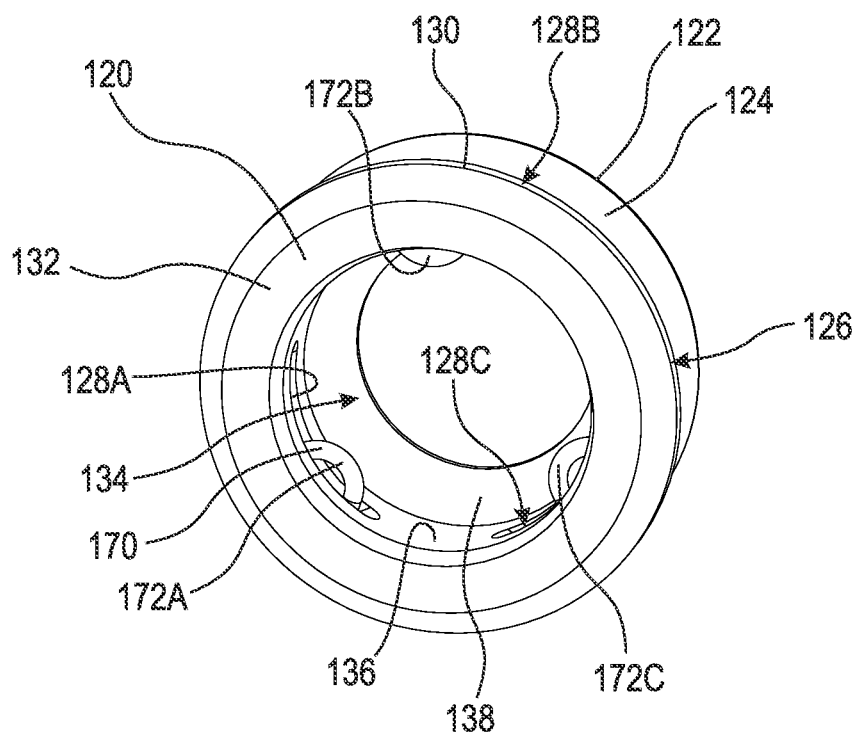
FIG. 6 is a perspective view of a cartridge and a retaining clip.
Figure 7:
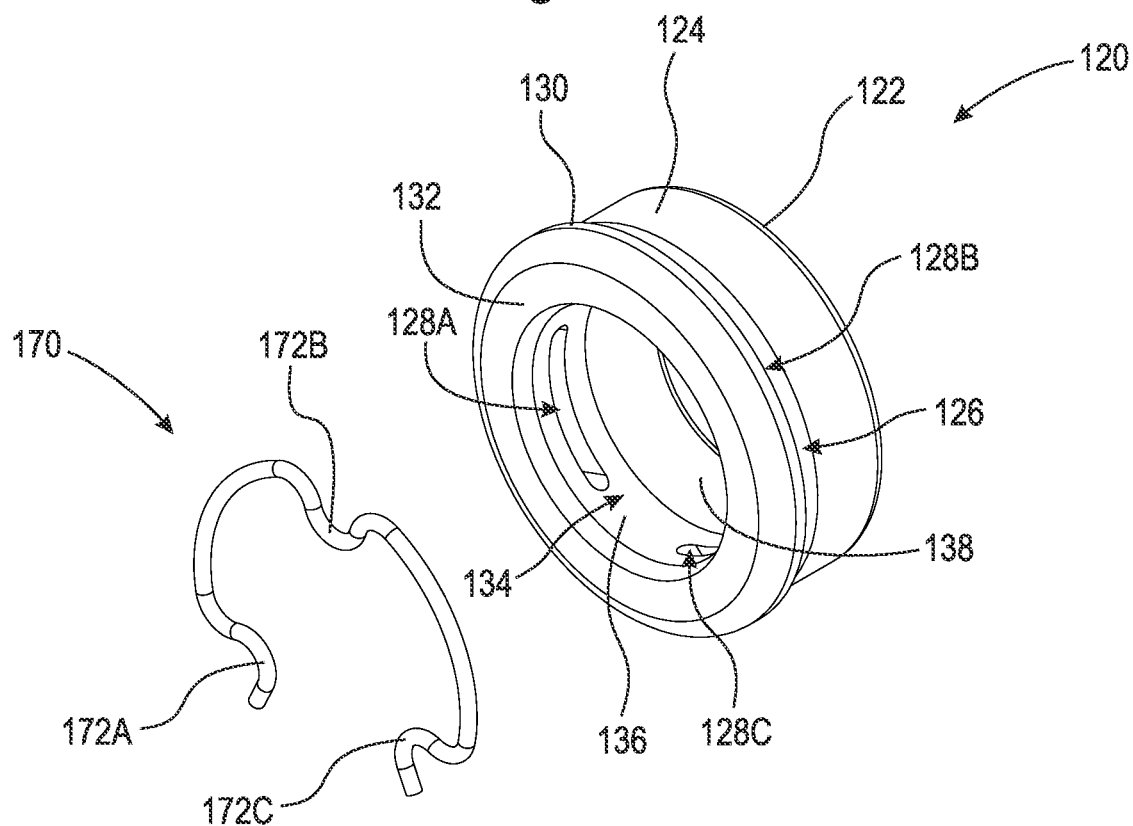
FIG. 7 is an exploded view of the cartridge and retaining clip shown in FIG. 6.

FIG. 6 is a perspective view of cartridge 120 and a retaining clip 170. FIG. 7 is an exploded view of cartridge 120 and retaining clip 170. The following description should be read in view of FIGS. 6 and 7.

Cartridge 120 is operatively arranged to carry and enclose retaining clip 170. Cartridge 120 comprises end 122, radially outward facing surface 124, radially outward facing surface 130, end 132, and through-bore 134. Radially outward facing surface 124 comprises radially outward facing groove 126. Groove 126 further comprises one or more apertures (e.g., apertures 128A-C) which extend from groove 126 to through-bore 134. In some embodiments, the dimeter of radially outward facing surface 124 is less than the diameter of radially outward facing surface 130. In some embodiments, the dimeter of radially outward facing surface 124 is equal to the diameter of radially outward facing surface 130. In some embodiments, the dimeter of radially outward facing surface 124 is greater than the diameter of radially outward facing surface 130. Cartridge 120 further comprises radially inward facing surface 136 proximate end 132 and radially inward facing surface 138 proximal end 122. In some embodiments, radially inward facing surface 136 comprises a constant diameter. In some embodiments, radially inward facing surface 136 comprises a variable diameter. In some embodiments, radially inward facing surface 138 comprises a variable diameter (e.g., is frusto-conical). In some embodiments, radially inward facing surface 138 comprises a constant diameter with a flange arranged to engage shoulder 87. Cartridge 120 is operatively arranged to be inserted, with end 122 first, into through-bore 41 at end 44 of connector body 40 and secured therein. In some embodiments, cartridge 120 comprises a metal. In some embodiments, cartridge 120 comprises a polymer. In some embodiments, cartridge 120 comprises a ceramic.

Retaining clip (or retaining ring or snap clip/ring) 170 is arranged in groove 126 in cartridge 120. Retaining clip 170 is generally a retaining ring including one or more protrusions extending radially inward. In the embodiment shown, retaining clip 170 comprises protrusions 172A-C. Protrusions 72A-C extend radially inward through apertures 128A-C in groove 126. Protrusions 172A-C are arranged to engage shoulder 87, specifically, shoulder surface 88, to secure tube end form 80 within cartridge 120 and thus connector body 40. Retaining clip 170 may comprise any material that is capable of elastically deforming and returning to its original shape (e.g., metal, polymer, etc.).

To assembly fluid connector 10, cartridge 120 with retaining clip 170 is inserted into connector body 40. End 122 of cartridge 120 engages surface 47 of connector body 40. End 122 thereby forms the second half of the seal or O-ring gland by enclosing seal 62 within groove 50. Radially outward facing surface 124 is arranged proximate to or engages with radially inward facing surface 46. Radially outward facing surface 130 is arranged proximate to or engages with flange 52. Flange 52 is then crimped radially inward to secure cartridge 20 within connector body 40. Specifically, section 56 is crimped or bent radially inward about bend line L1, until section 56 is arranged proximate to or abuts against end 132 of cartridge 120. In the secured state, cartridge 120 is prevented from displacement in axial direction AD1 by surface 47 and axial direction AD2 by crimped section 56.

Figure 8:
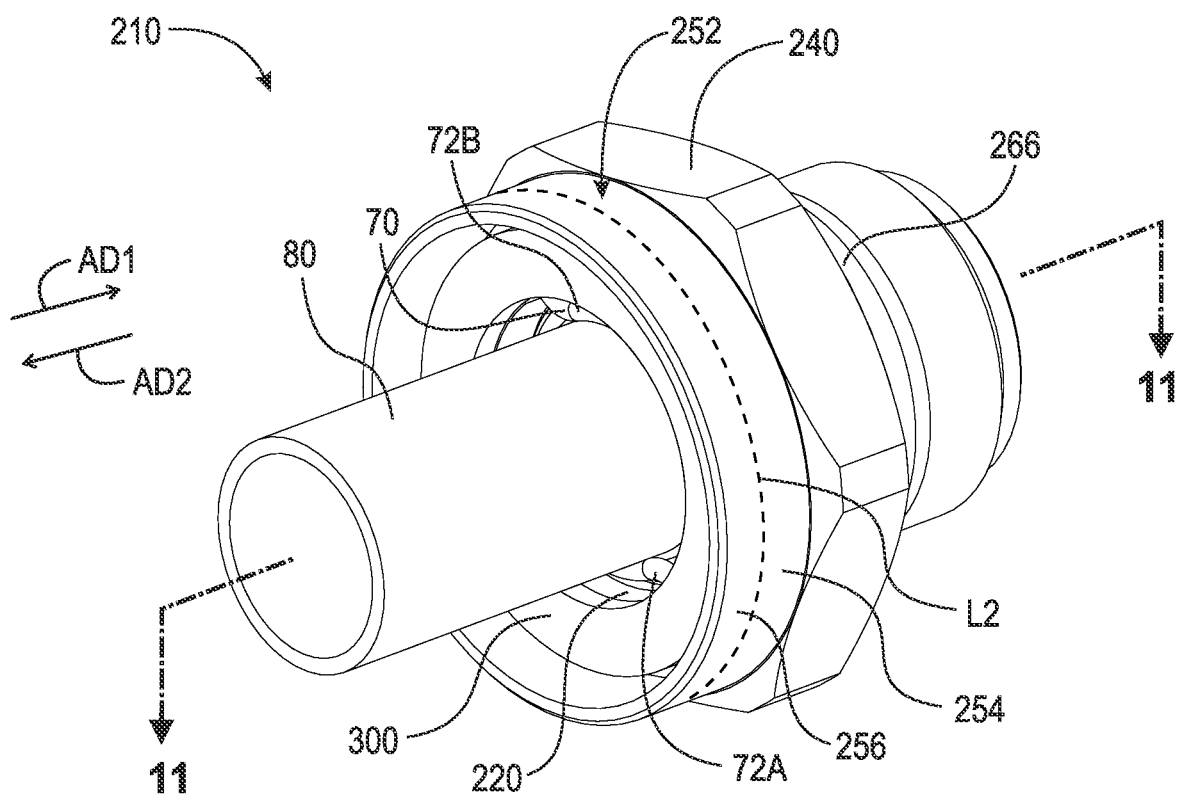
FIG. 8 is a perspective view of a fluid connector, in an unsecured state.
Figure 9:
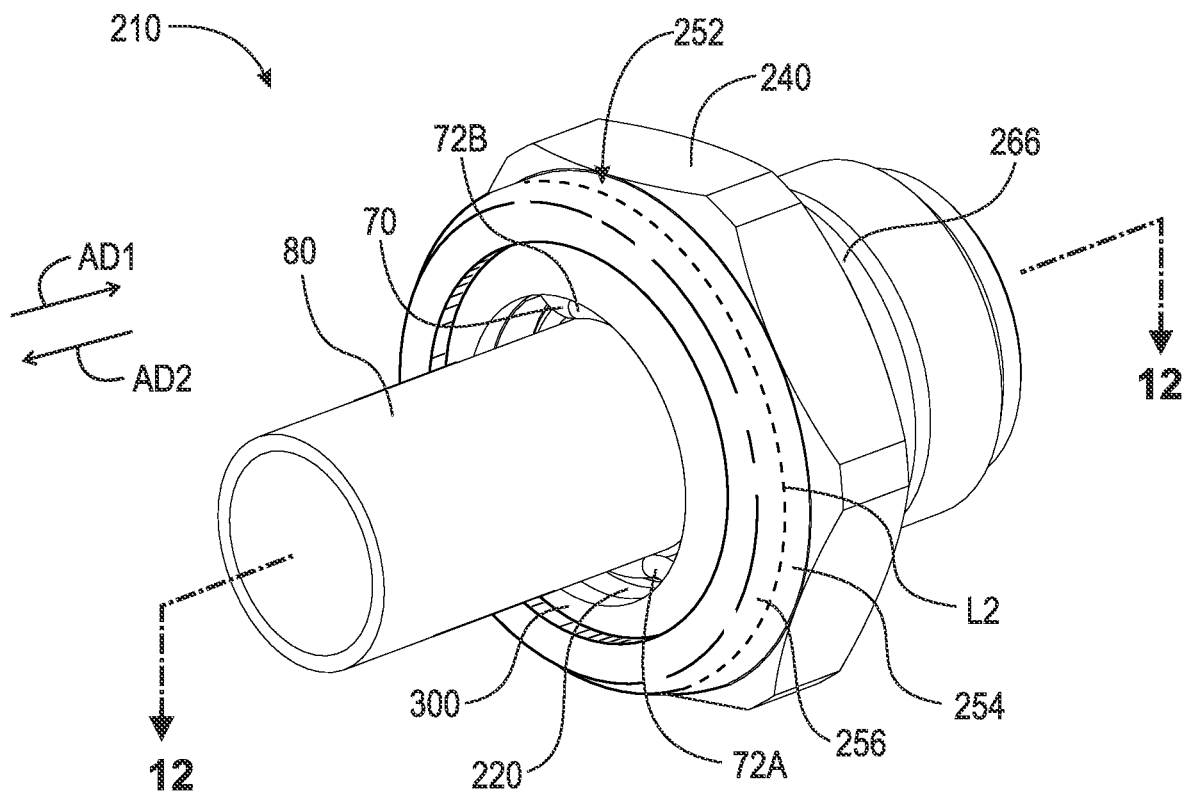
FIG. 9 is a perspective view of the fluid connector shown in FIG. 8, in a secured state.
Figure 10:
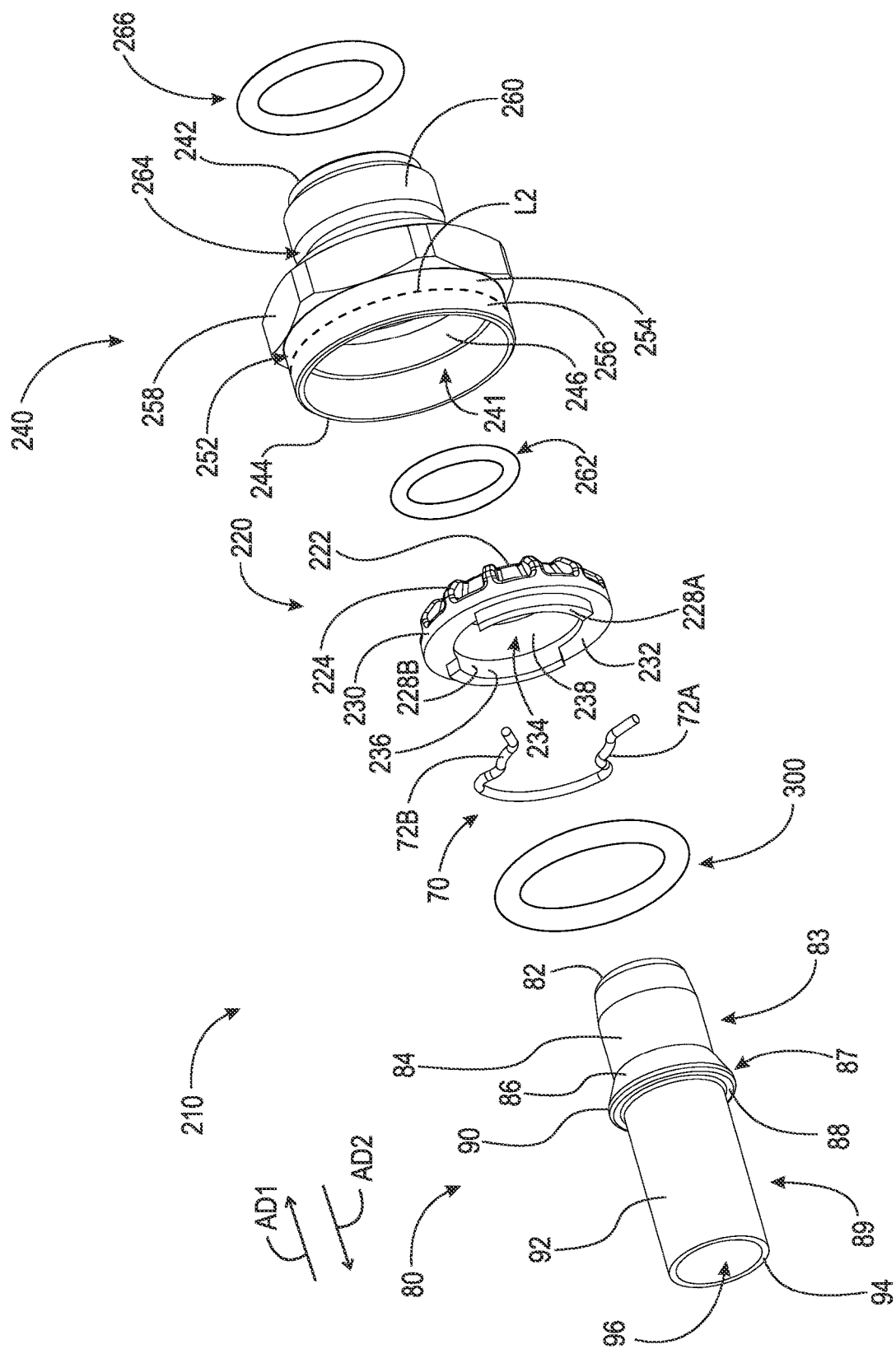
FIG. 10 is an exploded view of the fluid connector shown in FIG. 8.
Figure 11:
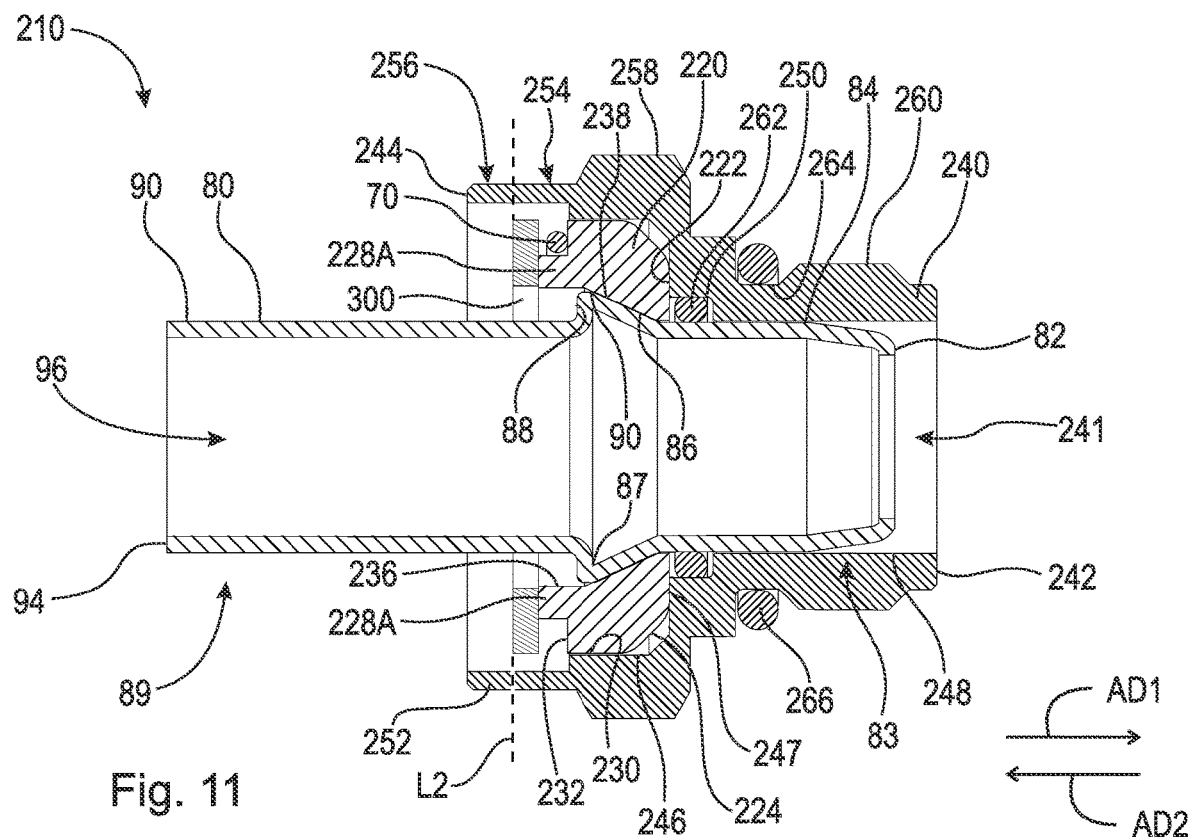
FIG. 11 is a cross-sectional view of the fluid connector taken generally along line 11-11 in FIG. 8.
Figure 12:
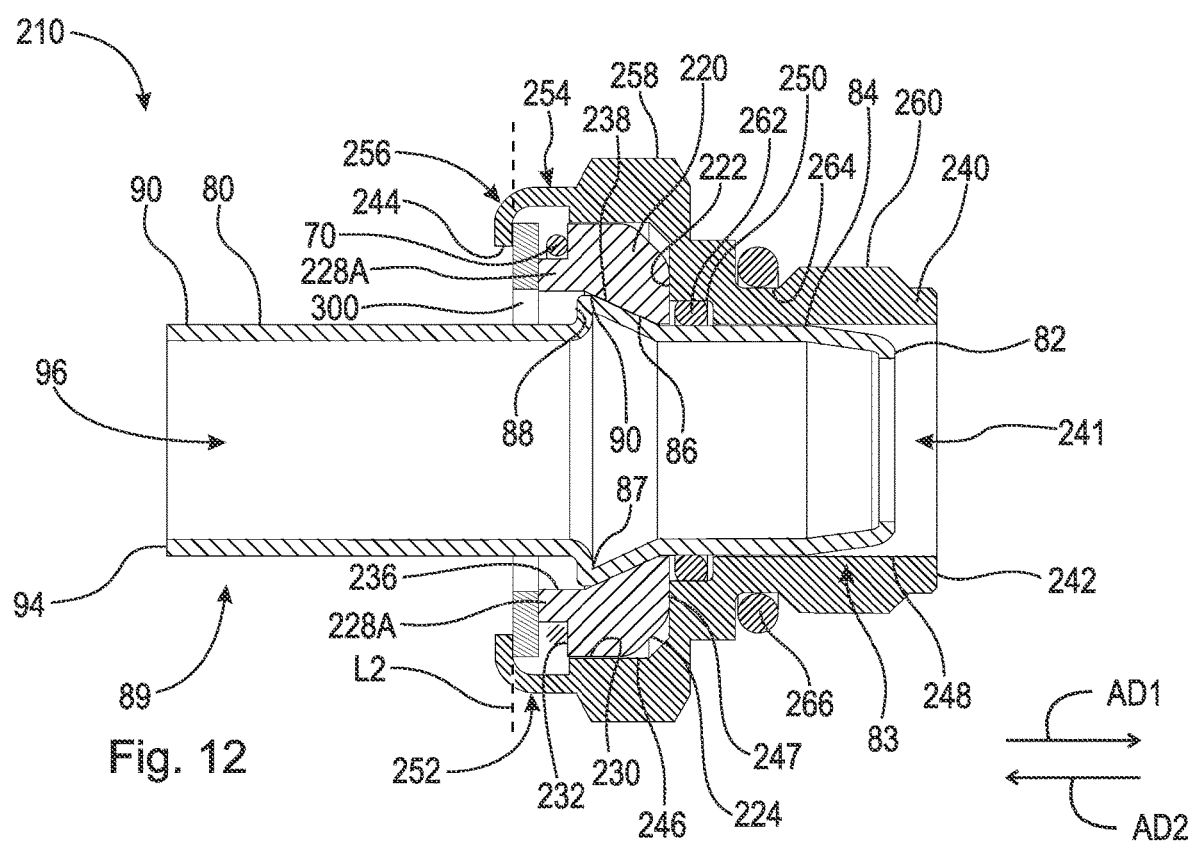
FIG. 12 is a cross-sectional view of the fluid connector taken generally along line 12-12 in FIG. 9.

FIG. 8 is a perspective view of fluid connector 210, in an unsecured state. FIG. 9 is a perspective view of fluid connector 210, in a secured state. FIG. 10 is an exploded view of fluid connector 210. FIG. 11 is a cross-sectional view of fluid connector 210 taken generally along line 11-11 in FIG. 8. FIG. 12 is a cross-sectional view of fluid connector 210 taken generally along line 12-12 in FIG. 9. Fluid connector 210 generally comprises cartridge 220, connector body 240, and tube end form 280. In some embodiments, fluid connector 210 further comprises washer 300. For the purposes of the present disclosure, "unsecured state" is intended to mean that flange 252 of connector body 240 has not yet been crimped over cartridge 220. "Secured state" is intended to mean that section 256 of flange 252 has been crimped over cartridge 220 (or cartridge 320) thereby securing cartridge 220 and retaining clip 70 (or 170) within connector body 240. The following description should be read in view of FIGS. 8-12.

Connector body 240 comprises through-bore 241 extending from end 242 to end 244, radially inward facing surface 246, radially inward facing surface 248, groove 250, flange 252, head 258, and radially outward facing surface 260. Connector body 240 is arranged to be connected to a component that is filled with a fluid. For example, connector body 240 may be connected to a transmission via radially outward facing surface 260, which may comprise external threading. Connector body 240 may be screwed into a threaded hole in the transmission via head 258 (e.g., using a wrench), which is then filled with transmission fluid. In some embodiments, head 258 is hexagonal; however, it should be appreciated that head 258 may comprise any geometry suitable for applying torque to connector body 240. Another component in which fluid connector 210, specifically connector body 240, may be installed into is an engine block. It should be appreciated that fluid connector 210 may be used in various other components, assemblies, and subassemblies in which fluid connection is desired. Radially outward facing surface 260 may further comprise groove 264. Seal or O-ring 626 may be arranged in groove 626 to create a fluid tight seal between connector body 424 and the component it is connected to. Seal 626 is arranged in connector body 424. Specifically, seal 626 is arranged in groove 525. In some embodiments, seal 626 is an O-ring. Body 424 further comprises surface 424, which extends between and is connected to radially inward facing surface 424 and radially inward facing surface 424. Surface 424 is operatively arranged to engage cartridge 222, as will be described in greater detail below. Flange 252 extends from head 258 in axial direction AD2. Flange 252 comprises section 254 and section 256, which are shown in the figures as being separated by fold line L2. It should be appreciated that fold line L2 is an imaginary line used solely for the purposes of describing the folding action of flange 252 herein. In some embodiments, connector body 240 comprises a metal. In some embodiments, connector body 240 comprises a polymer with flange 252 comprising a suitable malleable material. In some embodiments, connector body 240 comprises a ceramic with flange 252 comprising a suitable malleable material.

Tube end form 80 is arranged to be inserted, specifically with end 82 first, into connector body 240 and cartridge 220. Tube end form 80 is inserted into connector body 240 and cartridge 220 until retaining clip 70 snaps over shoulder 87. It is the engagement of protrusions 72A-B with shoulder surface 88 that secures tube end form 80 within connector body 240.

Cartridge 220 is operatively arranged to carry retaining clip 70. Cartridge 220 comprises end 222, radially outward facing surface 224, radially outward facing surface 230, end 232, and through-bore 234. In some embodiments, radially outward facing surface 224 comprises a variable diameter (e.g., is frusto-conical or tapered) and increases in diameter is axial direction AD2. In some embodiments, radially outward facing surface 224 comprises a constant diameter. In some embodiments, radially outward facing surface 230 comprises a constant diameter. In some embodiments, radially outward facing surface 230 comprises a variable diameter. Cartridge 220 further comprises one or more projections (e.g., projections 228A-B), which extend from end 232. Projections 228A-B are operatively arranged to align retaining clip 70, as will be described in greater detail below. Cartridge 220 further comprises radially inward facing surface 236 and radially inward facing surface 238. In some embodiments, radially inward facing surface 236 comprises a constant diameter. In some embodiments, radially inward facing surface 236 comprises a variable diameter. In some embodiments, radially inward facing surface 238 comprises a variable diameter (e.g., is frusto-conical). In some embodiments, radially inward facing surface 238 comprises a constant diameter with a flange arranged to engage shoulder 87. Cartridge 220 is operatively arranged to be inserted, with end 222 first, into through-bore 241 at end 244 of connector body 240 and secured therein. In some embodiments, cartridge 220 comprises a metal. In some embodiments, cartridge 220 comprises a polymer. In some embodiments, cartridge 220 comprises a ceramic.

Retaining clip (or retaining ring or snap clip/ring) 70 is arranged proximate end 232 on projections 228A-B. In some embodiments, retaining clip 70 is arranged on cartridge 220 such that protrusion 72B engages the (top) space between projection 228B and projection 228A, and protrusion 72A engages the (bottom) space between projection 228B and projection 228A. In some embodiments, retaining clip 70 is arranged on cartridge 220 such that protrusion 72A engages the (top) space between projection 228B and projection 228A, and protrusion 72B engages the (bottom) space between projection 228B and projection 228A. Protrusions 72A and 72B extend into through-bore 234 and are arranged to engage shoulder 87, specifically, shoulder surface 88, to secure tube end form 80 within cartridge 220 and thus connector body 240. Retaining clip 70 may comprise any material that is capable of elastically deforming and returning to its original shape (e.g., metal, polymer, etc.).

To assembly fluid connector 210, cartridge 220 is inserted into connector body 240. As shown in FIGS. 11-12, end 222 of cartridge 220 engages surface 247 of connector body 240. End 222 thereby forms the second half of the seal or O-ring gland by enclosing seal 262 within groove 250. Radially outward facing surface 224 and radially outward facing surface 230 are arranged proximate to or engage with radially inward facing surface 246. Retaining clip 70 is then arranged on cartridge 220. Specifically, and as previously discussed, retaining clip 70 is arranged on projections 228A-B such that protrusions 72A-B extend into through-bore 234 of cartridge 220. In some embodiments, washer 300 is then inserted into through-bore 241 of connector body 240. As shown in FIGS. 11-12, washer 300 is arranged proximate to or abuts against projections 228A-B, which encloses retaining clip 70 (i.e., retaining clip 70 is prevented from displacement in axial direction AD1 by end 232 and in axial direction AD2 by washer 300). Flange 252 is then crimped radially inward to secure cartridge 220 within connector body 240, as shown in FIG. 12. Specifically, section 256 is crimped or bent radially inward about bend line L2, until section 256 is arranged proximate to or abuts against washer 300. It should be appreciated that in some embodiments, when washer 300 is not present, section 256 is crimped radially inward proximate bend line L2 until section 256 is arranged proximate to or abuts against projections 228A-B of cartridge 220. In the secured state as shown in FIG. 12, cartridge 220 is prevented from displacement in axial direction AD1 by surface 247 and axial direction AD2 by crimped section 256. It should be appreciated that tube end form 80 is not inserted into cartridge 220 and connector body 240 until flange 252 has been crimped. FIG. 11 shows tube end form 80 inserted into cartridge 220 and connector body 240 in an unconnected state only to further illustrate the interaction and orientation of the components. However, tube end form 80 would not be present during the assembly of cartridge 220 and connector body 240.

Figure 13:
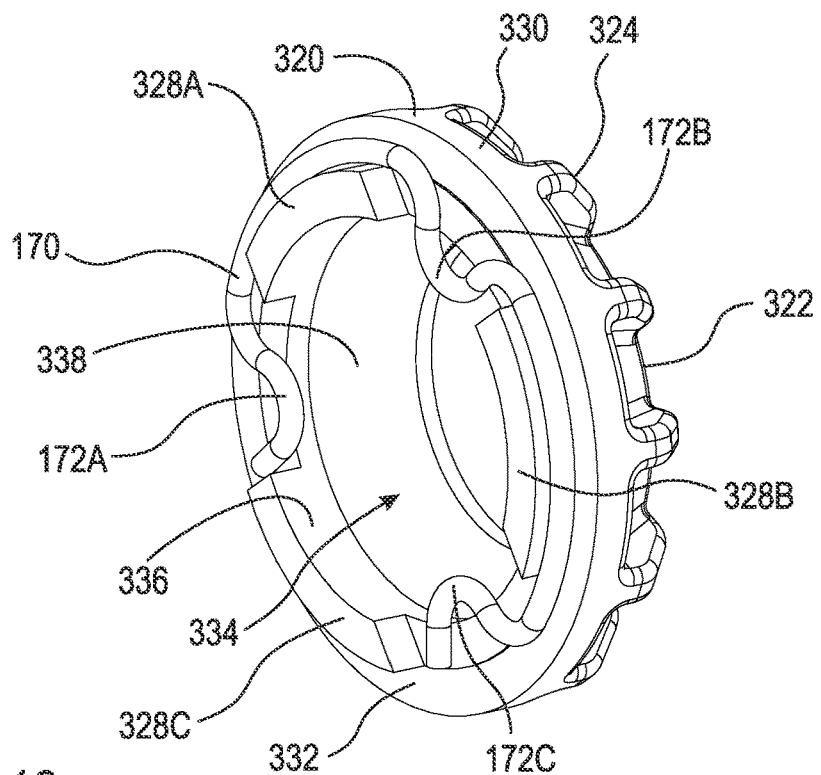
FIG. 13 is a perspective view of a cartridge and a retaining clip.
Figure 14:
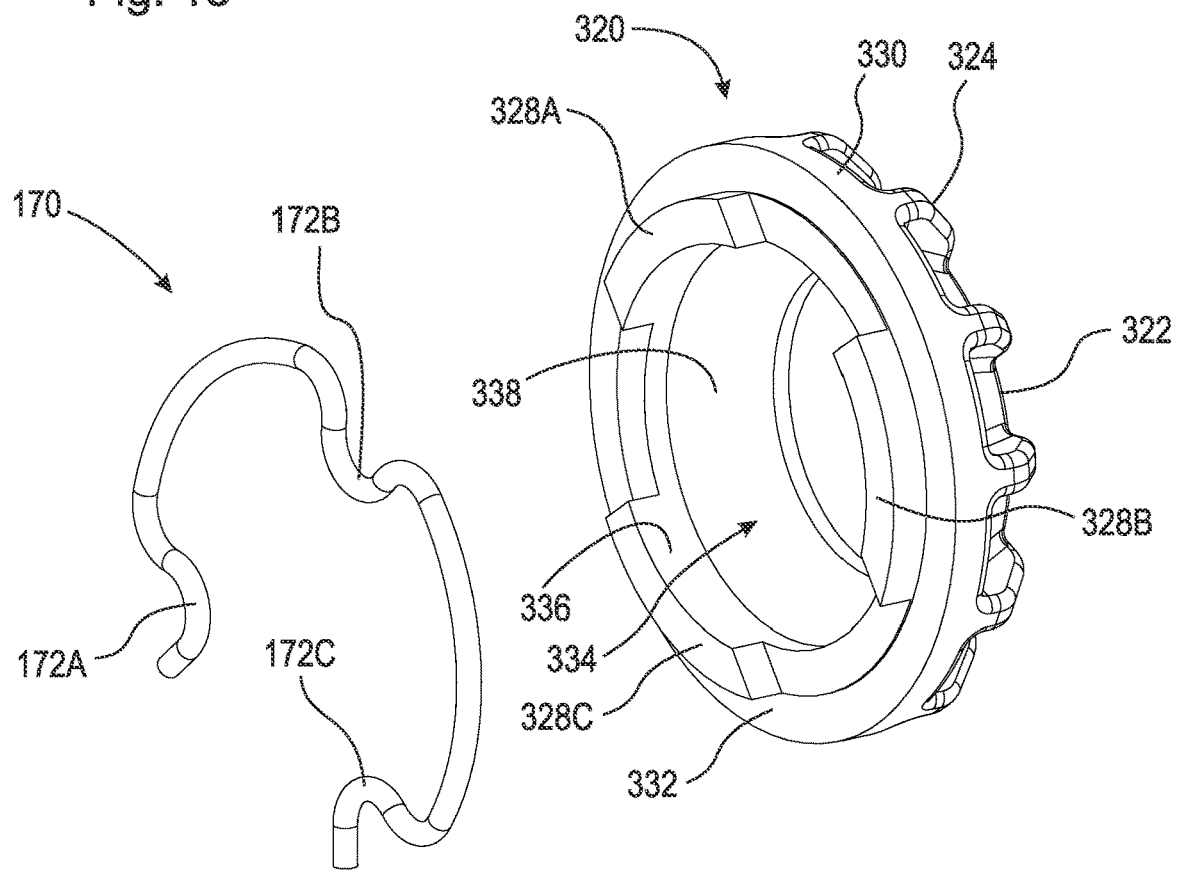
FIG. 14 is an exploded view of the cartridge and retaining clip shown in FIG. 13.

FIG. 13 is a perspective view of cartridge 320 and retaining clip 170. FIG. 14 is an exploded view of cartridge 320 and retaining clip 170. The following description should be read in view of FIGS. 13 and 14.

Cartridge 320 is operatively arranged to carry retaining clip 170. Cartridge 320 comprises end 322, radially outward facing surface 324, radially outward facing surface 330, end 332, and through-bore 334. In some embodiments, radially outward facing surface 324 comprises a variable diameter (e.g., is frusto-conical or tapered) and increases in diameter is axial direction AD2. In some embodiments, radially outward facing surface 324 comprises a constant diameter. In some embodiments, radially outward facing surface 330 comprises a constant diameter. In some embodiments, radially outward facing surface 330 comprises a variable diameter. Cartridge 320 further comprises one or more projections (e.g., projections 328A-C), which extend from end 332. Projections 328A-C are operatively arranged to align retaining clip 170, as will be described in greater detail below. Cartridge 320 further comprises radially inward facing surface 336 and radially inward facing surface 338. In some embodiments, radially inward facing surface 336 comprises a constant diameter. In some embodiments, radially inward facing surface 336 comprises a variable diameter. In some embodiments, radially inward facing surface 338 comprises a variable diameter (e.g., is frusto-conical). In some embodiments, radially inward facing surface 338 comprises a constant diameter with a flange arranged to engage shoulder 87. Cartridge 320 is operatively arranged to be inserted, with end 322 first, into through-bore 241 at end 244 of connector body 240 and secured therein. In some embodiments, cartridge 320 comprises a metal. In some embodiments, cartridge 320 comprises a polymer. In some embodiments, cartridge 320 comprises a ceramic.

Retaining clip (or retaining ring or snap clip/ring) 170 is arranged proximate end 332 on projections 328A-C. In some embodiments, retaining clip 170 is arranged on cartridge 320 such that protrusion 172A engages the space between projection 328C and projection 328A, protrusion 172B engages the space between projection 228A and projection 228B, and protrusion 172C engages the space between projection 228B and projection 228C (see FIG. 13). However, it should be appreciated that retaining clip 170 may be arranged in any suitable orientation (i.e., protrusions 172A-C engage any of spaces between projections 328A-C). Protrusions 72A-C extend into through-bore 334 and are arranged to engage shoulder 87, specifically, shoulder surface 88, to secure tube end form 80 within cartridge 220 and thus connector body 240. Retaining clip 170 may comprise any material that is capable of elastically deforming and returning to its original shape (e.g., metal, polymer, etc.).

To assembly fluid connector 210, cartridge 320 is inserted into connector body 240. End 322 of cartridge 320 engages surface 247 of connector body 240. End 322 thereby forms the second half of the seal or O-ring gland by enclosing seal 262 within groove 250. Radially outward facing surface 324 and radially outward facing surface 330 are arranged proximate to or engage with radially inward facing surface 246. Retaining clip 170 is then arranged on cartridge 320. Specifically, and as previously discussed, retaining clip 170 is arranged on projections 328A-C such that protrusions 172A-C extend into through-bore 334 of cartridge 320. In some embodiments, washer 300 is then inserted into through-bore 241 of connector body 240. Washer 300 is arranged proximate to or abuts against projections 328A-C, which encloses retaining clip 170 (i.e., retaining clip 170 is prevented from displacement in axial direction AD1 by end 332 and in axial direction AD2 by washer 300). Flange 252 is then crimped radially inward to secure cartridge 320 within connector body 240. Specifically, section 256 is crimped or bent radially inward about bend line L2, until section 256 is arranged proximate to or abuts against washer 300. It should be appreciated that in some embodiments, when washer 300 is not present, section 256 is crimped radially inward proximate bend line L2 until section 256 is arranged proximate to or abuts against projections 328A-C of cartridge 320. In the secured state, cartridge 320 is prevented from displacement in axial direction AD1 by surface 247 and axial direction AD2 by crimped section 256.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

REFERENCE NUMERALS

10 Fluid connector
20 Cartridge
22 End
24 Radially outward facing surface
26 Groove
28A Aperture
28B Aperture
30 Radially outward facing surface
32 End
34 Through-bore
36 Radially inward facing surface
38 Radially inward facing surface
40 Connector body
41 Through-bore
42 End
44 End
46 Radially inward facing surface
47 Surface
48 Radially inward facing surface
50 Groove
52 Flange
54 Section
56 Section
58 Head
60 Radially outward facing surface
62 Seal
64 Groove
66 Seal
70 Retaining clip
72A Protrusion
72B Protrusion
80 Tube end form
82 End
83 Section
84 Radially outward facing surface
86 Radially outward facing surface
87 Shoulder
88 Surface
89 Section
90 Radially outward facing surface
92 Radially outward facing surface
94 End
96 Through-bore
120 Cartridge
122 End
124 Radially outward facing surface
126 Groove
128A Aperture
128B Aperture
128C Aperture
130 Radially outward facing surface
132 End
134 Through-bore
136 Radially inward facing surface
138 Radially inward facing surface
210 Fluid connector
220 Cartridge
222 End
224 Radially outward facing surface
228A Projection
228B Projection
230 Radially outward facing surface
232 End
234 Through-bore
236 Radially inward facing surface
238 Radially inward facing surface
240 Connector body
241 Through-bore
242 End
244 End
246 Radially inward facing surface
247 Surface
248 Radially inward facing surface
250 Groove
252 Flange
254 Section 256 Section
258 Head
260 Radially outward facing surface
262 Seal
264 Groove
266 Seal
320 Cartridge
322 End
324 Radially outward facing surface
328A Projection
328B Projection
328C Projection
330 Radially outward facing surface
332 End
334 Through-bore
336 Radially inward facing surface
338 Radially inward facing surface
L1 Line
L2 Line
AD1 Axial direction
AD2 Axial direction

What is claimed is:

1. A cartridge for a fluid connector including a connector body having a bore and a flange, and a tube end form, the cartridge comprising:
a first end;
a second end;
a first radially outward facing surface arranged between the first end and the second end;
a through-bore;
a plurality of projections extending in a first axial direction from and circumferentially spaced about the second end, the plurality of projections forming a second radially outward facing surface including at least one aperture extending radially inward to the through-bore; and
a retaining clip including at least one protrusion operatively arranged to extend into the through-bore;
further comprising a radially inward facing surface operatively arranged to engage a shoulder of the tube end-form, wherein the radially inward facing surface is frusto-conical.

2. The cartridge as recited in claim 1, wherein the retaining clip is arranged on the second radially outward facing surface and the at least one protrusion extends through the at least one aperture.

3. The cartridge as recited in claim 1, further comprising a third radially outward facing surface extending from the first radially outward facing surface to the first end, the third radially outward facing surface being frusto-conical and decreasing in diameter in a second axial direction, opposite the first axial direction.

4. The cartridge as recited in claim 1, further comprising a washer removably engaged with the plurality of projections, wherein the retaining clip is arranged axially between the second end and the washer.

5. The cartridge as recited in claim 4, wherein:
the first radially outward facing surface includes a first diameter;
the second radially outward facing surface includes a second diameter; and
the first diameter is greater than the second diameter.

6. The cartridge as recited in claim 1, wherein the cartridge is operatively arranged to be secured in the bore by crimping the flange radially inward.

7. A fluid connector, comprising:
a connector body, including:
a first end;
a second end;
a first through-bore;
a first groove arranged circumferentially within the first through-bore;
a seal arranged within the first groove; and
a flange; and
a cartridge arranged completely within the connector body, including:
a third end;
a fourth end;
a second through-bore;
a first radially outward facing surface including at least one aperture extending radially inward to the second through-bore; and
a retaining clip operatively arranged on the first radially outward facing surface, the retaining clip including at least one protrusion extending through the at least one aperture and into the second through-bore.

8. The fluid connector as recited in claim 7, wherein the flange comprises a first section and a second section, the second section is crimped radially inward and engages the fourth end to secure the cartridge in the first through-bore and form a connected state.

9. The fluid connector as recited in claim 8, wherein:
in an unconnected state, the second section is substantially aligned with the first section; and
in the connected state, the second section is substantially perpendicular to the first section and is engaged with the fourth end.

10. The fluid connector as recited in claim 7, wherein the first radially outward facing surface comprises a second groove and the at least one aperture is arranged in the second groove.

11. The fluid connector as recited in claim 7, wherein the cartridge further comprises a radially inward facing surface operatively arranged to engage a shoulder of a tube end form.

12. The fluid connector as recited in claim 11, wherein the radially inward facing surface is frusto-conical.

13. The fluid connector as recited in claim 11, wherein the retaining clip is operatively arranged to secure the tube end form to the connector body.

14. The fluid connector as recited in claim 8, wherein in the connected state, the third end encloses the seal within the first groove.

15. A fluid connector, comprising:
a connector body, including:
a first through-bore;
a first groove arranged circumferentially within the first through-bore;
a seal arranged within the first groove; and
a malleable flange; and
a cartridge operatively arranged to be secured in the first through-bore, including:
a first end;
a second end;
a second through-bore;
a first radially outward facing surface including at least one aperture extending radially inward to the second through-bore; and
a retaining clip operatively arranged to extend through the at least one aperture and into the second through-bore;
wherein the malleable flange is crimped radially inward over the second end to secure the cartridge within the connector body.

16. The fluid connector as recited in claim 15, wherein the malleable flange comprises a first section and a second section, the second section is operatively arranged to be crimped radially inward to secure the cartridge in the first through-bore and form a connected state.

17. The fluid connector as recited in claim 16, wherein:
in an unconnected state, the second section is not engaged with the second end; and
in the connected state, the second section is engaged with the second end.

18. The fluid connector as recited in claim 7, wherein the cartridge is arranged axially between and spaced apart from the first end and the second end.

\* \* \* \* \*